United States Patent

Reudink et al.

[11] Patent Number: 5,884,147
[45] Date of Patent: Mar. 16, 1999

[54] METHOD AND APPARATUS FOR IMPROVED CONTROL OVER CELLULAR SYSTEMS

[75] Inventors: Douglas O. Reudink; Mark Reudink, both of Bellevue, Wash.

[73] Assignee: Metawave Communications Corporation, Redmond, Wash.

[21] Appl. No.: 582,525

[22] Filed: Jan. 3, 1996

[51] Int. Cl.⁶ .................................................. H04Q 7/20
[52] U.S. Cl. ........................... 455/67.1; 455/63; 455/452
[58] Field of Search .............................. 455/62, 63, 67.1, 455/67.3, 436, 438, 439, 440, 441, 452, 453, 446, 509, 513

[56] References Cited

U.S. PATENT DOCUMENTS

| | | | |
|---|---|---|---|
| 5,280,472 | 1/1994 | Gilhousen et al. | 370/18 |
| 5,347,535 | 9/1994 | Karasawa et al. | 375/1 |
| 5,369,786 | 11/1994 | Hulsebosch | 455/67.1 |
| 5,442,804 | 8/1995 | Gunmar et al. | 455/446 |
| 5,475,868 | 12/1995 | Duque-Anton et al. | 455/62 |
| 5,565,873 | 10/1996 | Stuart | 342/372 |
| 5,570,412 | 10/1996 | LeBlanc | 455/456 |
| 5,669,062 | 9/1997 | Olds et al. | 455/509 |

FOREIGN PATENT DOCUMENTS

| | | |
|---|---|---|
| 0431956 | 6/1991 | European Pat. Off. . |
| 0585994 | 3/1994 | European Pat. Off. . |
| 9403992 | 2/1994 | WIPO . |

OTHER PUBLICATIONS

Almgren M. et al: "Adaptive Channel Allocation in Tacs", Globecom '1995. IEEE Global Telecommunications Conference, Singapore, Nov. 14–16, 1995, vol. 2, Institute of Electrical and Electronics Engineers, pp. 1517–1521, XP000623039, see p. 1517, left–hand column, Line 4–line 10, see p. 1518, paragraph IIA—paragraph IIC.

Dennis A. Jiraud, "Broadband CDMA for Wireless Communication," Applied Microwave & Wireless, p. 22.

CDMA Network Engineering Handbook, Draft Version XI, Chapter 2, pp. 2–1 through 2–12.

George L. Turin, "Introduction to Spread–Spectrum Antimultipath Techniques and Their Application to Urban Digital Radio," IEEE, Mar. 1980, vol. 68, No. 3, pp. 328–353.

William C.Y. Lee, "Overview of Cellular CDMA," May 1991, vol. 40, No. 2, pp. 291–302.

Primary Examiner—Dwayne D. Bost
Assistant Examiner—Myron K. Wyche
Attorney, Agent, or Firm—Fulbright & Jaworski L.L.P.

[57] ABSTRACT

System and apparatus for actively managing calls in a wireless cellular network. A host receives input data from a plurality of cells regarding the status of calls in that cell. Input data may include call variables such as carrier signal strength over interference (C/I), forward and reverse link power, beam and channel assignments, handoff status, and triangulation data regarding location/movement of active calls. The host processes the input data with reference to known cell neighborhoods, and creates output data for each cell that includes information on other active calls in the neighborhood. The output data then updates the cell with information regarding active calls in the cell's vicinity. The cell may then make adjustments to call variables taking into account local interference conditions. Further, through reference to (1) fixed data regarding the network such as topography or statistics, and/or (2) immediate past historical data regarding active calls, the host may also create output data taking into account predicted impending interference conditions.

35 Claims, 6 Drawing Sheets

METHOD AND APPARATUS FOR IMPROVED CONTROL OVER CELLULAR SYSTEMS

RELATED APPLICATIONS

Reference is hereby made to the following three co-pending and commonly assigned U.S. patent applications: APPARATUS, SYSTEMS AND METHODS FOR ANTENNA COMBINING IN WIRELESS COMMUNICATIONS SYSTEMS, Ser. No. 08/488,793; MULTIPLE ANTENNA TRANSMISSION SYSTEM, Ser. No. 08/520,316; and SYSTEM AND METHOD FOR FREQUENCY MULTIPLEXING ANTENNA SIGNALS, Ser. No. 08/520,000; the disclosures of which three applications are incorporated herein by reference.

TECHNICAL FIELD OF THE INVENTION

This invention relates generally to the management of wireless communications in a cellular network, and more specifically to the use of a centralized host to monitor intelligently certain transmission characteristics of potentially interfering communications.

BACKGROUND OF THE INVENTION

It is known that the performance of wireless communications systems, and particularly mobile cellular systems, can be affected by a number of factors. Generally, such cellular systems are operated over these factors to achieve an optimum ratio of signal strength to interference (C/I) for the reception experienced by each mobile user while still providing enough capacity throughout the system.

Recent advances have been made in addressing various of these individual factors that affect reception performance. The emergence of Code Division Multiple Access (CDMA) as a method of broadcasting multiple signals simultaneously on a single broad frequency band throughout the system has remediated problems of co-channel interference and multipath fading. The arrival of CDMA has also simplified cell-to-cell handoff procedures, creating a "soft" handoff that eliminates frequency assignment and management.

Improvements in cellular capacity and call quality through the use of coordinated multiple antennas are also now known. For example, above-referenced copending and commonly assigned U.S. Patent applications APPARATUS, SYSTEMS AND METHODS FOR ANTENNA COMBINING IN WIRELESS COMMUNICATIONS SYSTEMS and MULTIPLE ANTENNA TRANSMISSION SYSTEM teach substituting multiple narrow-beam antenna configurations for traditional single or three-face base-station antennas. According to these inventions, the use of time delay techniques with summing of the received CDMA signal allows the output of multiple antennas to be combined and interpreted by receiver technology standard in the art. Among other improvements, these inventions allow assignment of a narrow transmission beam between the base station and the mobile, thereby reducing the potential for signal interference and facilitating forward-link and reverse-link power management.

Further innovation is taught in above-referenced co-pending, commonly assigned U.S. Patent application SYSTEM AND METHOD FOR FREQUENCY MULTIPLEXING ANTENNA SIGNALS, in which the down-mixing and subsequent up-mixing of the outputs of multiple antenna signals with pre-selected local oscillator frequencies permit said signals to be combined and carried simultaneously on a reduced number of antenna cables.

A need now exists for an intelligent control system that will synergize the advantages offered by some of the foregoing recent innovations, thereby providing overall improved wireless service to the mobile user.

Moreover, the current art recognizes that cells in a cellular system also typically act autonomously within parameters set for the cellular system. The exception is in regard to handoff, where neighboring cells will typically coordinate a channel change as a mobile enters a new cell. Especially in high interference environments, however, autonomous cell operation, substantially without reference to neighboring cells, can increase the potential for co-channel interference, possibly causing signal quality degradation or, worse still, loss of call or assignment of the signal to the wrong mobile.

Currently, the possibility of such co-channel interference is minimized by devising cell re-use patterns that adopt "worst case assumptions" about required channel bandwidth separation and physical spatial separation of cells. The available spectrum for each carrier normally consists of a plurality of channels combined into 21 channel sets. These channel sets are than separated by a maximum physical distance in order to reduce co-channel interference. Since each cell is generally comprised of three 120-degree sectors, each sector has only seven channel sets to work with. Typically, a passive channel re-use pattern is devised whereby it is left to a predetermined configuration of physical cell separation and neighboring channel allocation to minimize the potential for co-channel interference.

An intelligent control system, in which cell operation and channel assignment is actively inter-coordinated, would therefore also enhance cellular capacity. Further, by utilizing narrow beam technology such as disclosed in the above-referenced co-pending commonly assigned U.S. patent application, dynamic beam control and power management could be combined with interactive channel assignment to provide a system with optimum capacity and reduced signal interference.

SUMMARY OF THE INVENTION

The present invention coordinates wireless communication activity within a cell with respect to R, a predetermined radius extending out from the cell, within which neighborhood the activity of other cells will influence decisions to be made by the cell of interest. R may be selected so that one single controller ("host") may simultaneously coordinate the activity of all cells within an entire network. It will be readily appreciated, however, that as the number of cells simultaneously coordinated by one host increases (i.e. R increases), the number of interrelated decisions expected of the host increases exponentially, thus rapidly demanding great sophistication in the processing capability of the host.

It may therefore not be feasible or even desirable to have just one host coordinating an entire network. Certainly, the breakdown of a single host controlling an entire network of cells could have catastrophic results. Advantageously, therefore, a host could be used in combination with intelligence decentralized to cell base stations. In this alternative, the host's primary function would be to receive information from all cells, parse the information and assign such parsed portions to individual cells based on relevance to call activity in those cells, and then route the parsed portions to their assigned cells. Intelligence at the individual cell level could then control call activity within the cell based on interpreting the information provided by the host regarding conditions in the vicinity.

In this embodiment, it will be appreciated that each cell served by the host will have a "neighbor list" of cells known to the host, which, by definition, will be the vicinity of a particular cell in which prevailing conditions are of operational interest to the referenced cell. The "neighbor list" may be as large or as small as other variables allow. Since the activity of cells outside this "neighbor list" is, however, by definition not of interest to the referenced cell, the host may ignore conditions in such "foreign" cells with respect to the referenced cell.

Another embodiment of the present invention contemplates that although decentralized intelligence from the host to the cell might be advantageous, it is not a requirement. In this embodiment, therefore, one or more hosts control groups of cells centrally, making decisions centrally and sending direct instructions out to cells. In this embodiment, several hosts may be used to coordinate discrete or overlapping neighborhoods of cells. These hosts might act independently, or could be coordinated themselves by second and even higher levels of coordinating controllers.

A third embodiment recognizes that based on prevailing conditions in the network, the host could discriminate between data received from cells as to which data require real time processing to enable effective call management, and which can be processed off-line. In this way, host processing power may be used economically.

It will therefore be appreciated that the design of a cell neighborhood to be coordinated by a single host will depend on a combination of several variables—the processing power of the host, the level of control intelligence desired to be decentralized to cell base stations, the "cell structure" to be controlled (number of cells in the neighborhood, the value of R selected, etc.), the level of inter-related cell coordination desired, the volume of traffic expected, and so forth.

The information processed by the host for each cell will be dependent on calls being initiated by or in progress within that cell at a given moment in time. The variables monitored by the host for each call within a cell may include:

(a) C/I;
(b) Forward link power;
(c) Reverse link power;
(d) Beam assignment;
(e) Cell assignment;
(f) Channel assignment;
(g) Handoff status; or
(h) Triangulation of location/movement of call within the cell.

The host will receive information from cells regarding one or more of these variables for each call active within the cell. Depending on how the host is configured to exercise control, the host may then correlate these variables for all active calls in a cell, cross-reference this information with similar information regarding active calls in the cell's "neighbor list," and then take action accordingly with respect to one or more calls. Alternatively, as described above, the host may parse information received and redirect such parsed portions as are relevant to individual cells. The individual cells may then take action with respect to calls active in the cell based upon the information sent by the host. Further, as described in more detail below, information may also be stored, either at the host or by individual cells, to facilitate automated prediction of impending conditions to be experienced by calls based on immediate past information.

In processing call information, a guiding standard to optimize call quality and service is advantageously to maintain acceptable C/I for each call. Advantageously, all actions with respect to a call should have C/I in mind. While C/I remains optimized, actions may also be taken in furtherance of secondary objectives, such as minimizing the call's adverse influence on other calls in progress elsewhere in the neighborhood.

An example of such a call optimization process in more detail would be for the cell to select a channel and monitor for whether a call transmitter is active within that cell on that channel. If so, in accordance with the above-referenced co-pending and commonly assigned patent application, the cell may then increment narrow antenna beams, measuring and identifying the beam assignment offering the strongest RSSI (nominally the sum of C+I for that beam). Having identified the beam with the strongest RSSI, the cell may then refer to information most recently received from the host on conditions prevailing nearby, and then determine if this beam assignment is acceptable with respect to its effect on nearby active calls. If not, the cell may then identify the beam with the second or third strongest RSSI and determine if either of these beam assignments are acceptable in the context of prevailing conditions nearby. If such beam assignments are still unacceptable, the cell may then resort to taking action on the call, such as modifying forward and/or reverse link power, changing channel assignment, and so on, as further described below.

Forward link power is easily adjusted by information sent by the host to the cell. Reverse link power can be adjusted by tricking the cell into believing that the signal strength from the mobile has deviated from a predetermined acceptable range, even though the signal strength is actually in that range. This trick may be advantageously accomplished by deliberately amplifying or attenuating the mobile's RF signal as received by the cell outside the acceptable range so as to trigger an artificial reverse link power boost or cut.

The present invention may also easily control beam assignment. Technology such as taught by above-referenced co-pending and commonly assigned U.S. Patent applications APPARATUS, SYSTEMS AND METHODS FOR ANTENNA COMBINING IN WIRELESS COMMUNICATIONS SYSTEMS and MULTIPLE ANTENNA TRANSMISSION SYSTEM may advantageously facilitate this control. Beam assignment should advantageously discriminate between values of I (the interference level) in similar values of C/I. In such cases, beams should be assigned according to lower values of I for a given carrier level. It may even be preferable to make beam assignments to antennas likely to experience lower values of C when the next logical beam assignment based on C is likely to experience unacceptably high I.

It will be understood that cell assignment control requires the ability to initiate handoffs as the mobile moves in and out of range of various cells. This is normally done at the cell base station level. The present invention may enhance control over call C/I, however, by altering cell assignment artificially in an appropriate situation. For example, I for a call in a given cell may have increased to where the call may actually benefit from a premature handoff to a neighboring cell. Conversely, it may be advantageous to delay handoff when I in the new cell is detected as being unacceptably high. The present invention may force such artificial handoffs by reducing apparent C for the call and tricking the cell assignment protocol into believing that a mobile is out of the cell's range. Methods of reducing apparent C include (1) not updating a beam assignment as a mobile moves beyond a beam's lobe, allowing the power to roll off as the mobile leaves the lobe, or (2) deliberately attenuating C to below a handoff level as it is received.

The same principles apply in controlling channel assignment. Again, premature or delayed handoffs may be triggered artificially in order to optimize C/I experienced by a call and to reduce exposure of the call to conditions of high I.

The monitoring of handoff status by the present invention therefore becomes advantageous in order to facilitate the control over beam, cell and channel assignment described above.

It will be further understood that the collection of triangulation data informing the present invention of the location and movement of active calls within cells will be highly advantageous. Knowledge of this information for multiple calls facilitates cross-referencing of conditions in neighboring cells to enable the control over call performance described above. In an embodiment where the host is parsing the collective information received from cells and redirecting portions back to individual cells based on relevance to those cells, knowledge of call location and movement within cells assists determining the information that will be relevant to a particular cell. Further, accumulated data regarding historical location and movement of calls within cells is also useful in predicting conditions likely to be experienced shortly by a call.

The present invention's ability to predict future conditions for calls is a feature directed to further improve overall performance in successfully controlling calls. As noted, the relative location and movement of active calls through cells are important data in formulating such predictions. If memorialized periodically with some accuracy, these data may be combined with knowledge of prevailing conditions in cells and may thereby allow anticipation of impending potential adverse conditions. Compensating action may then be made accordingly at the appropriate moment. Such performance has clear benefits over an uncoordinated system that merely reacts to adverse conditions when monitored.

The mobile's future movement through the cell may be predicted with further accuracy by tracking past movement against known data such as predominant traffic routes, time of day, street layout, etc. Further sophistication in movement prediction may be achieved by comparing past movement with known data regarding cell topography. For example, a mobile known to be travelling at 50 mph through a cell is very likely to follow the path of a major road.

Adverse conditions for a call may then anticipated by correlating the likely future movement of the referenced mobile with static conditions such as landscape topography, beam lobe and cell range, as well as dynamic conditions such as the likely interfering movement of other mobiles.

It will be further understood that the present invention's feature of continuously monitoring interactive cell conditions also provides additional advantages even when no calls are active in one or more cells. By continuing to monitor RSSI within cells, even when there are no active calls, each cell may contribute data towards compilation of an "interference map," or "I map". Information drawn from this "I map" may then be used by nearby cells in which there are active cells to optimize the performance of those cells. This feature of compiling an "I map" for community use, even when call activity is light, is a further synergistic advantage of the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
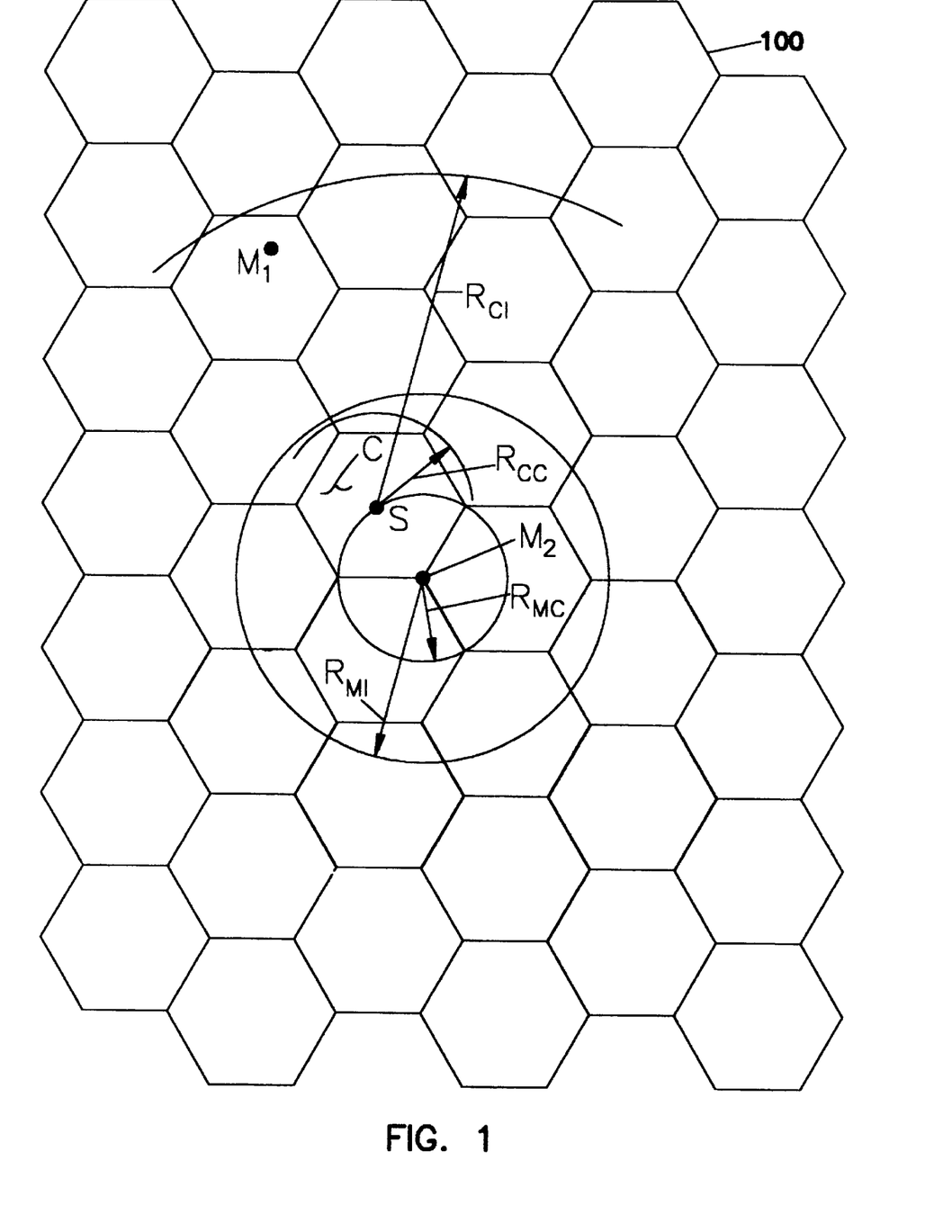
FIG. 1 is a diagram illustrating the potential for interference in a traditional cellular network 100.

FIG. 1 illustrates a wireless cellular communications system with traditional features known to generate the potential for call interference. Suppose that C is a cell of interest in cellular network 100. C is serving active mobile calls $M_1$ and $M_2$. C reaches $M_1$ and $M_2$ through C's base station S.

It will be readily seen that in order to continue to serve $M_1$, S must operate to a radius of $R_{ci}$, the radius of cell interference, even though the radius required to cover C is only $R_{cc}$, the radius of cell coverage. $R_{ci}$ therefore tends to affect many cells unrelated to communication between $M_1$ and S.

An analogous effect is also typically caused by the mobile. Referring again to FIG. 1, $M_2$ actually requires to transmit only to $R_{mc}$, the radius of mobile coverage, in order to reach S. However, proper communication at all times within $R_{ci}$ requires $M_2$ in fact to transmit to $R_{mi}$, the radius of mobile interference. Again, it will be readily seen that $R_{mi}$ tends to affect many cells unrelated to communication between $M_2$ and S.

Figure 2:
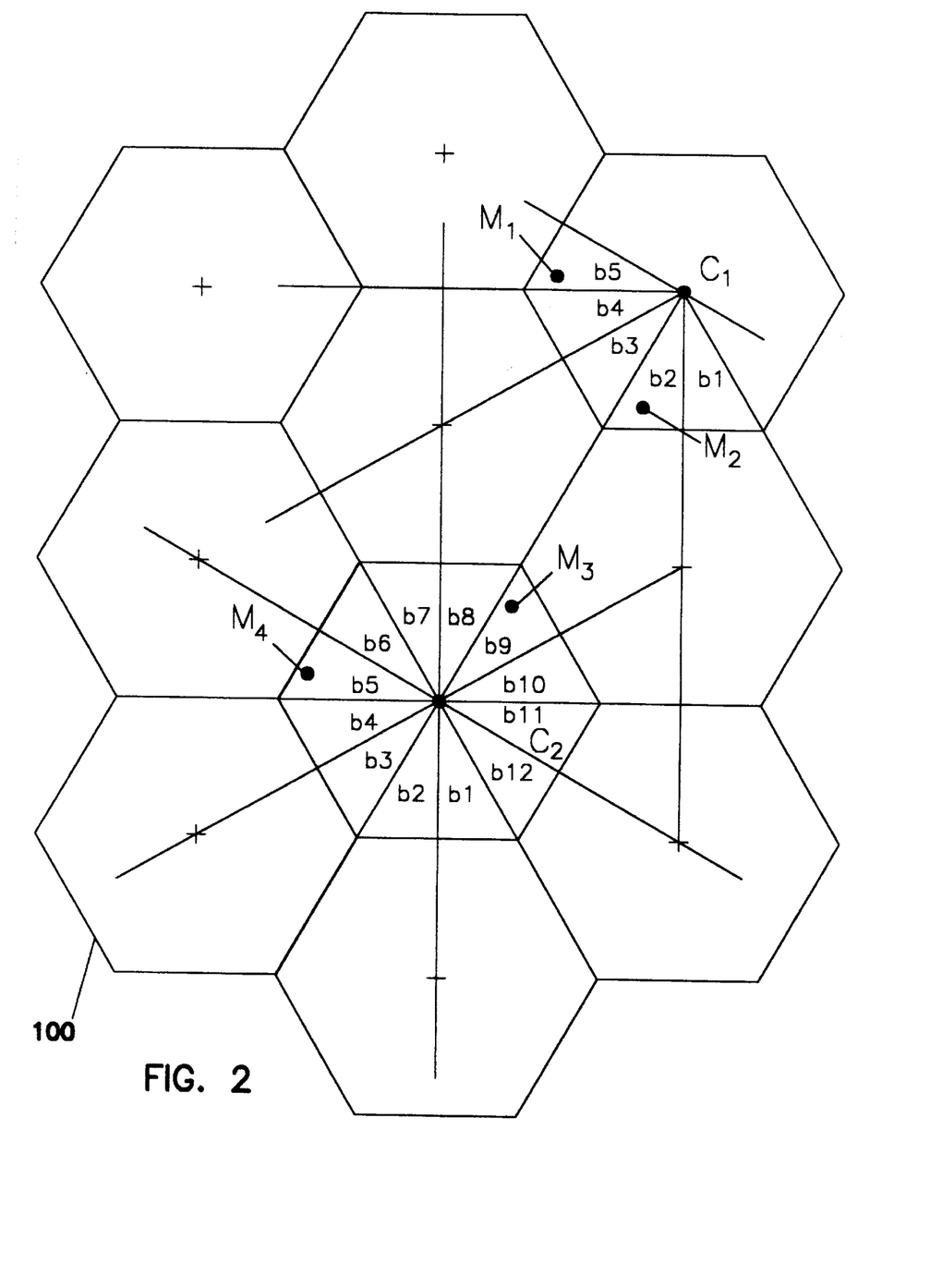
FIG. 2 is a diagram illustrating how the potential for interference in cellular network 100 may be reduced by management of beam assignments and other variables.

FIG. 2 illustrates how the foregoing problems are considerably remediated by coordinated management of narrow antenna beam assignment and other variables through a host, such as taught by the present invention. Suppose $C_1$ and $C_2$ are base stations in two cells of interest in cellular network 100, each operating an array of twelve narrow beams $C_1b_1$–$C_1b_{12}$ and $C_2b_1$–$C_2b_{12}$ respectively. $M_1$ and $M_2$ are active mobile calls being served by $C_1$, while $M_3$ and $M_4$ are active mobile calls being served by $C_2$. The host is not shown in FIG. 2, but is controlling in accordance with the principles taught by the present invention.

It will be seen immediately that even if operating on the same channel, there is almost no possibility of interference between $M_1$ and $M_4$. Referring back to FIG. 1, however, this likely would not be the case absent narrow beam management. $R_{mi}$, the mobile interference radius for $M_1$ and $M_4$, would almost certainly overlap.

With regard to $M_2$ and $M_3$ on FIG. 2, there is a possibility for interference, especially if they are operating on the same channel. In this situation, the present invention could cause one of several actions to be taken to remove the potential for interference. The most logical action would be to change the channel assigned to one of the mobile calls. This alternative may not necessarily be available, however, depending on other prevailing conditions in cellular network 100. A second alternative would be to attenuate forward or reverse link power for one (or both) of $M_2$ or $M_3$. Alternatively, assuming C/I would remain acceptable, a beam assignment change could be forced for one of the mobiles, say to $C_1b_1$ for $M_2$, or to $C_2b_{10}$ for $M_3$. Following such a beam assignment change, it can be seen clearly from FIG. 2 that the possibility is remote that $M_3$ might encounter interference from $C_1b_1$, or that $M_2$ might encounter interference from $C_2b_{10}$.

Figure 3:
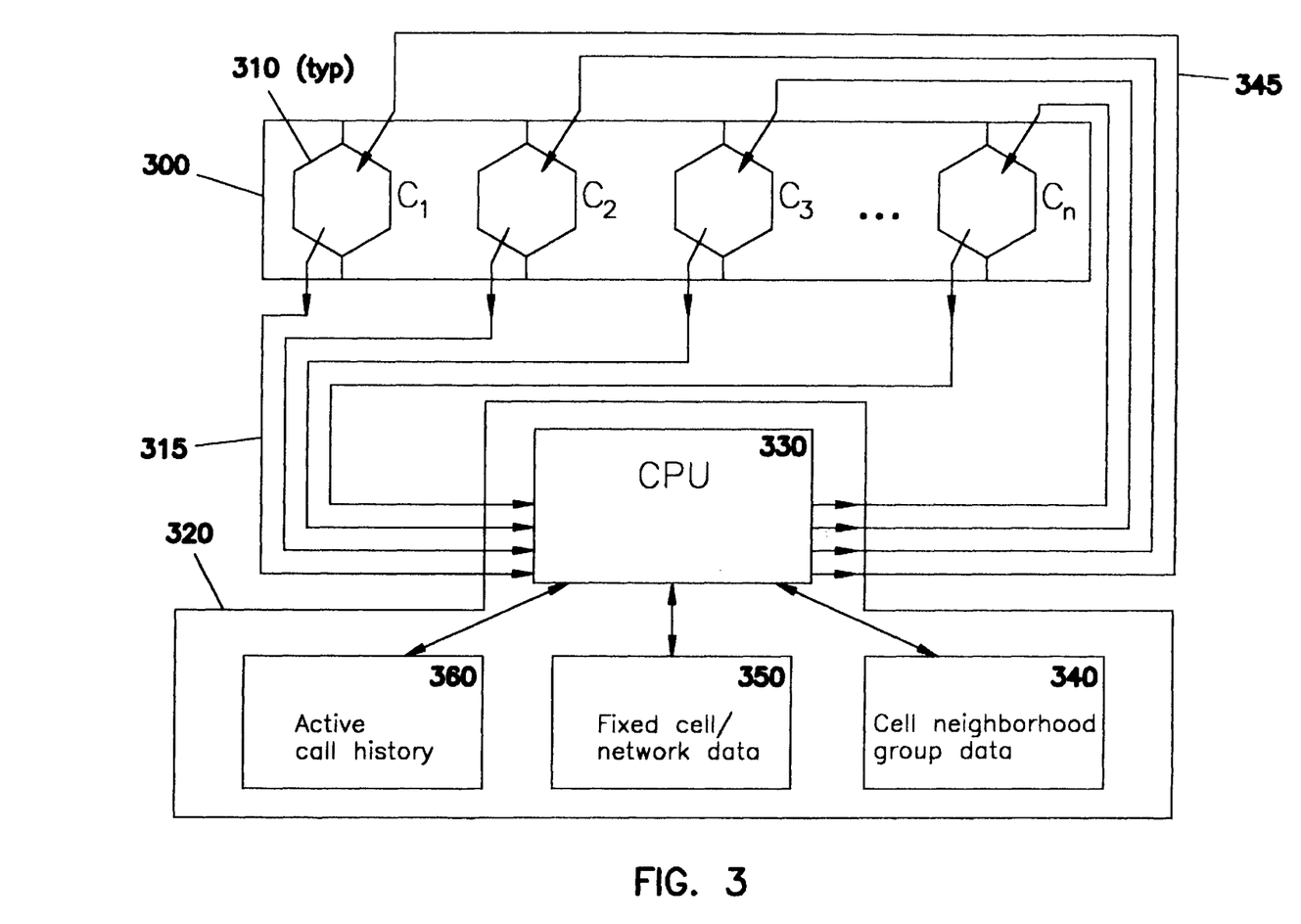
FIG. 3 is a diagram illustrating conceptually the present invention and its information flow.

FIG. 3 illustrates in more detail how the present invention may process data in order to gain the advantages disclosed above. Cellular network 300 comprises a plurality of cells 310, each one denominated individually $C_1$ through $C_n$. Cells 310 periodically send input data 315 to host 320 regarding active calls in cells 310. Input data 315 may include values of C/I, forward or reverse link power, beam assignment, channel assignment, handoff status or triangulation data pinpointing location/movement of active calls.

Host 320 includes CPU 330 and neighborhood group data 340. As further described below, host 320 may also advantageously include fixed cell/network data 350 and/or active call history 360. CPU 330 accumulates input data 315 received from cells 310, and processes it with respect to cell neighborhood group data 340. The initial accumulation of input data 315 will also advantageously include sorting and validation thereof.

Cell neighborhood group data 340 supplies CPU 330 with pre-defined relationships established between each of cells 310 and one or more of its neighbors within cellular network 300. These relationships group together, for each of cells 310, other cells in which call activity may affect the referenced cell.

In a first embodiment herein, CPU 330 parses input data 315, and, upon reference to cell neighborhood group data 340, creates specific output data 345 that, for each of cells 310, includes updated information on call activity in that cell's neighborhood group. Host 320 then sends each of cells 310 its respective output data 345. Decentralized intelligence in cells 310 may then act upon output data 345, and then send updated input data 315 back to host 320 to initiate another management cycle.

The sophistication of output data 345 is also advantageously enhanced when CPU 330 creates output data 345 with reference to fixed cell/network data 350 and/or active call history 360. Fixed cell/network data 350 stores pre-identified information regarding network 300 and cells 310 such as topography, street layouts, or statistics regarding geographic call volumes or peak cell usage times. Active call history 360 archives input data 315 as received from cells 310. Fixed cell/network data 350 and/or active call history 360 may then inform CPU to create output data 345 also with reference to fixed features in network 300 and with intelligence regarding immediate past history of active calls. In this way, in creating output data 345, CPU 330 may also anticipate impending conditions for active calls in ones of cells 310, and include that information in output data 345 to those cells. As noted above, an example of this predictive intelligence is for CPU 330 to use fixed cell/network data 350 and active call history 360 to recognize that an active call in one of cells 310 is travelling at speed along a major road. CPU 330 may then "prepare" or "forewarn" upcoming cells on the path of this road of the arrival of the call. Further, the impending interaction of this call with other active calls in the vicinity may also be anticipated. Further still, adjustments to this call may be scheduled to compensate for conditions expected to be encountered by this call as it travels its predicted path.

A second embodiment herein contemplates that there is little or no decentralized intelligence at cells 310, in which case CPU 330 will make central decisions on management of calls in cells, and then create output data 345 as a series of direct instructions to cells 310.

A third embodiment herein contemplates that CPU 330 may discriminate among input data 315 in deciding which require real time processing to manage calls effectively, and which may be processed off-line. For example, it will be understood that output data 345 regarding multiple active calls in close physical proximity are more likely to be needed to be created in real time in order to manage the calls effectively. On the other hand, particularly when there are few active calls, or the calls are widely dispersed, predictive functions may be better suited to be processed off-line.

Figure 4:
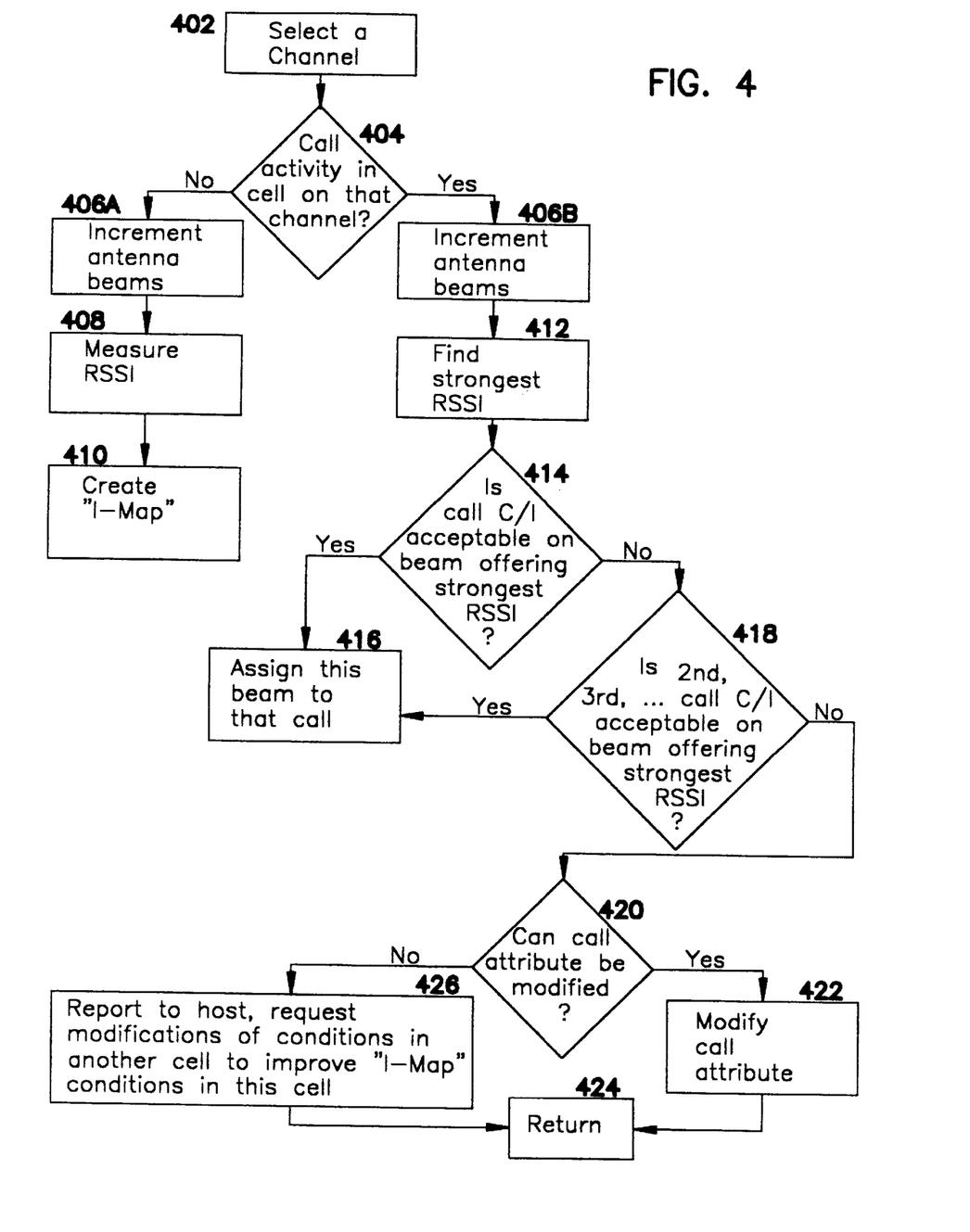
FIG. 4 is a logic flow diagram illustrating a presently preferred embodiment of the call optimization process taught by the present invention.

Referring to FIG. 4, an exemplary call optimization process is described, consistent with the first embodiment of the present invention as described above. The cell selects a channel to monitor (block 402), and then determines whether there are active calls within the cell on that channel (block 404). Either way, the cell will then increment narrow antenna beams in accordance with above-referenced, co-pending and commonly assigned U.S. patent applications APPARATUS, SYSTEMS AND METHODS FOR ANTENNA COMBINING IN WIRELESS COMMUNICATIONS SYSTEMS and MULTIPLE ANTENNA TRANSMISSION SYSTEMS (blocks 406A and 406B).

If the cell detected no call activity on that channel in block 404, then the cell nonetheless continues to measure RSSI as it increments antenna beams (block 408), and in doing so creates "I map" within that cell for the information of other cells in which there may be call activity (block 410). It will be understood that the compilation of this "I map" may take place at either the cell or the host, depending on the desired level of decentralized processing expected of a cell.

If, on the other hand, the cell detects call activity on the channel in block 404, it then increments antenna beams (block 406B) with a view to determining which beam offers the strongest RSSI for the call (block 412).

The cell may then analyze C/I for the call on the beam offering the strongest RSSI to determine whether that C/I is acceptable (block 414). If it is, then the cell may assign that beam to that call (block 416). If not, the cell may then refer to the beams offering subsequently lower values of RSSI, to determine whether call C/I would be acceptable on those beams (block 418). Ultimately, according to preselected parameters, the cell will either assign the call to a beam (block 416), or will identify that further processing will be require to optimize the call.

It will be recognized that such optimizing and determining of acceptability needs to be made with reference to both improving C/I for the call and minimizing the impact of such optimization on other calls nearby. If the call may be optimized by modifying one of its attributes and such attribute modification will not unacceptably affect C/I adversely for another active call elsewhere in the network (block 420), then the cell may proceed to make such attribute modification (block 422). As described above, the cell's determination of whether a call attribute modification will adversely affect another active call elsewhere in the network may be with reference to information provided to the cell by the host regarding conditions in nearby cells. Further, as also described above, it will be understood that among the call attributes available to the cell for modification are forward or reverse link power, channel assignment, and beam assignment.

Having modified a call attribute (block 422), the cell may then return for a fresh cycle of call optimization (block 424).

If, however, the cell is unable to modify a call attribute without adversely affecting other active calls elsewhere, the cell may then report this status to the host and request modification of conditions of nearby cells so as to create conditions that will allow the call to be accommodated (block 426).

Figure 5:
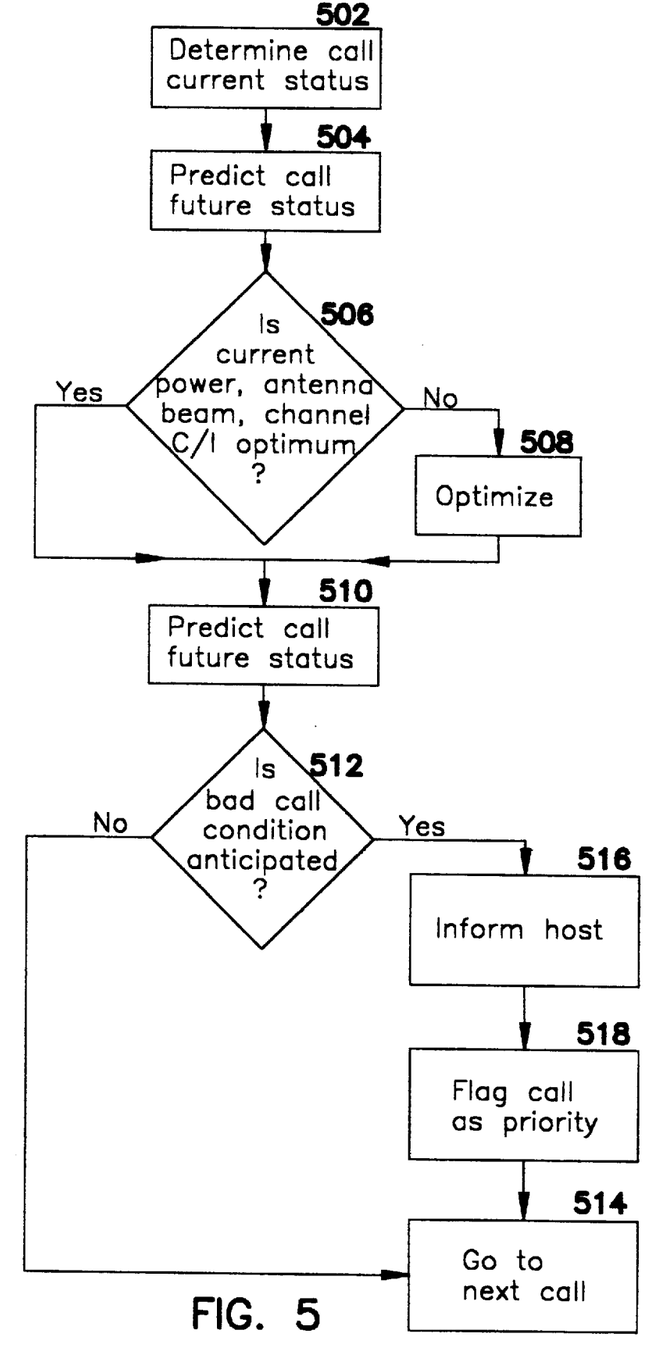
FIG. 5 is a logic flow diagram illustrating a presently preferred embodiment of the call tracking process taught by the present invention.

With reference to FIG. 5, an exemplary call tracking process is described, consistent with the first embodiment described above, in which the cell does decentralized processing based on information regarding nearby cell conditions provided by the host. The cell determines the call's current status (block 502) with reference to attributes described above, such as C/I, forward/reverse link power, beam and channel assignment, territorial location, etc. The cell may then predict the future status of the call (block 504) with reference to said attributes, both by itself and in relation to other influencing factors such as cell topography and the likely influence of other call activity nearby.

Having predicted the call's likely future status, corrections to certain attributes of the call may now be necessary to optimize the call with reference to both present and immediate future conditions (blocks 506 and 508).

It may then be advantageous, although not essential, for the cell to make adjustments to its earlier prediction of the call's future status following changes in cell conditions while call attributes were being re-optimized (block 510). Whether or not predictions for the call's future status are updated, however, the cell may then determine if a bad call condition is likely in light of the overall call situation (block 512). If no bad call condition should be anticipated, the cell may then switch to a similar analysis cycle for another call, or repeat the cycle for this call (block 514).

If, however, a bad call condition should be anticipated, the cell may inform the host (block 516) and may also flag the call as a priority for subsequent attention (block 518). The host may then inform cells near where the bad call condition is anticipated that adjustments to calls under their control may be necessary to avoid the bad call condition.

Figure 6:
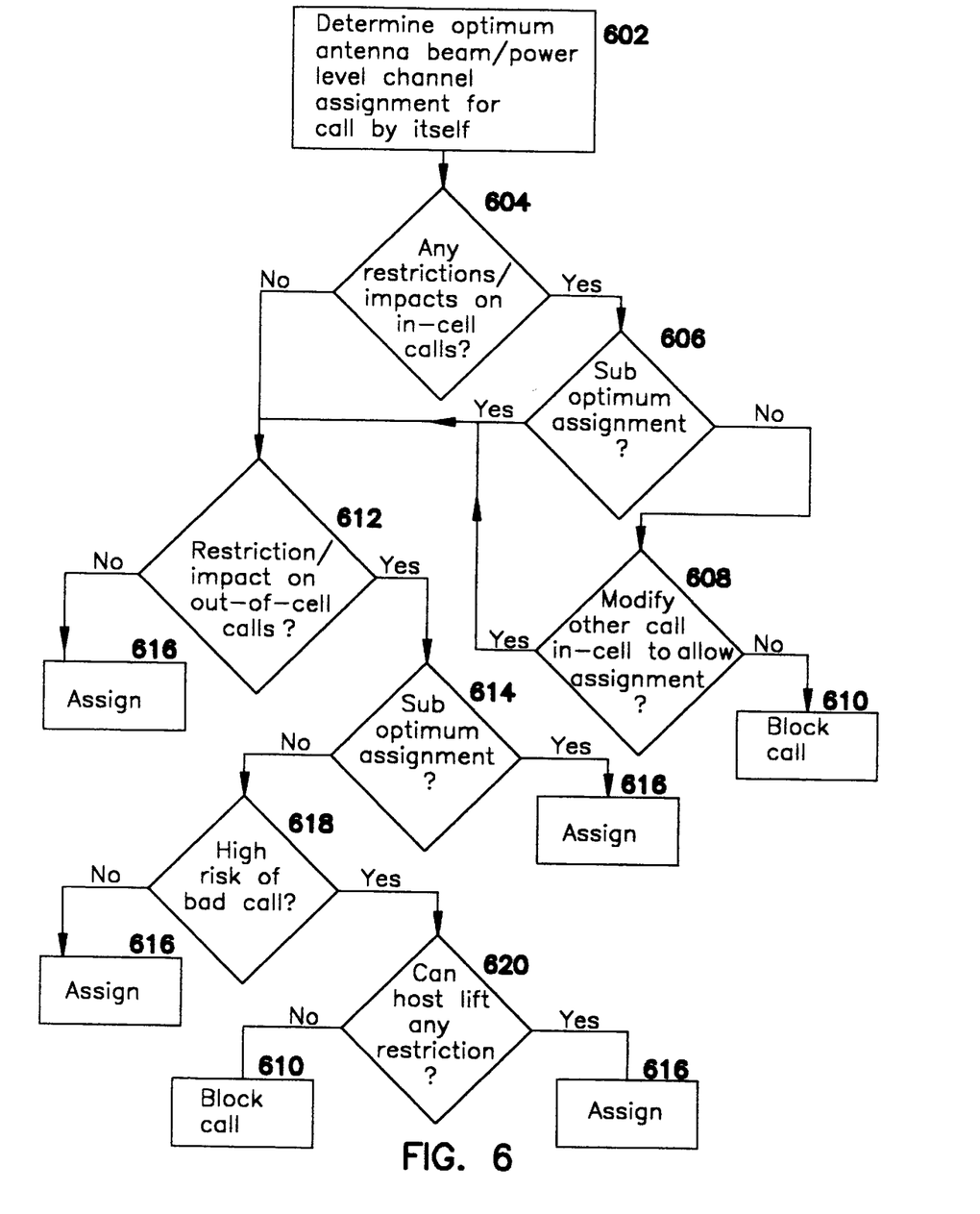
FIG. 6 is a logic flow diagram illustrating a presently preferred embodiment of the cell/host interaction process taught by the present invention.

FIG. 6 illustrates an exemplary cell/host interaction process where the host, in accordance with the first embodiment described above, distributes information to cells regarding call activity nearby so that cells may make local adjustments to active calls based on that information. It will understood, however, that the logic flow disclosed by FIG. 6 is not dependent on any particular level of decentralization of processing from the host to the cell. Accordingly, unless specifically noted otherwise, the cell/host interaction process illustrated in FIG. 6 will be described below without reference to whether a particular step in the process will be executed by the cell or the host.

With reference to FIG. 6, therefore, the present invention determines optimum conditions, such as antenna beam, power level or channel assignment for a call without reference to interaction with other active calls (block 602). Determination may then be made whether the attributes of this call, as optimized, impose any restrictions or otherwise impact other active calls in the same cell (blocks 604).

If in-cell restrictions or impacts are imposed, an alternative sub-optimum assignment for the call may be evaluated (block 606), or the attributes of other in-cell calls may be modified to facilitate co-existence of all calls (block 608).

If sub-optimum assignment is not feasible, or if modifications to attributes of other in-cell calls are not available to allow complete co-existence, the present invention may have to block the call temporarily (block 610), at least until conditions for that call improve.

Assuming the call can be optimized to co-exist with other in-cell calls, the present invention may then make an analysis as to whether the call will impose any restrictions or impacts on other out-of-cell calls (blocks 612, 614 and 616). If that analysis foresees a possible restriction or impact on another out-of-cell call, the present invention may determine whether this potential restriction or impact presents high risk of a bad call (block 618). If so, then it may be possible for the host to lift one or more restrictions on affected calls so as to allow all calls to co-exist (block 620). Ultimately, throughout the process illustrated by FIG. 6, the call will either be assigned (blocks 616) or blocked temporarily (blocks 610).

Although the present invention and its advantages have been described in detail, it should be understood that various changes, substitutions and alterations can be made herein without departing from the spirit and scope of the invention as defined by the appended claims.

I claim:

1. A method for managing a plurality of wireless communications within a cellular network, comprising the steps of:

monitoring the transmission characteristics of ones of the wireless communications; and optimizing the transmission characteristics of wireless communications according to monitored transmission characteristics of nearby wireless communications;

wherein said optimizing step further comprises the steps of:

modifying ones of the transmission characteristics so as to allow ones of the wireless communications to continue at artificially sub-optimum transmission conditions; and temporarily blocking ones of the wireless communications if the artificially sub-optimum transmission conditions are not feasible for wireless communications.

2. The method of claim 1, wherein the step of monitoring wireless communication transmission characteristics includes monitoring for one or more transmission characteristics selected from the group consisting of:

(a) communication signal strength;

(b) communication interference level;

(c) forward link signal power;

(d) reverse link signal power;

(e) cell assignment;

(f) antenna beam assignment;

(g) communication channel assignment;

(h) handoff status;

(i) territorial location of wireless communications within the cells;

(j) directional travel of mobile wireless communications within the cells; and (k) velocity of mobile wireless communications within the cells.

3. The method of claim 1, wherein the step of optimizing wireless communication transmission characteristics includes modifying one or more transmission characteristics selected from the group consisting of:

(a) communication signal strength;

(b) forward link signal power;

(c) reverse link signal power;

(d) cell assignment;

(e) antenna beam assignment;

(f) communication channel assignment; and (g) handoff status.

4. The method of claim 1, wherein the step of monitoring wireless communication transmission characteristics is performed centrally.

5. The method of claim 4, wherein the step of optimizing wireless communication transmission characteristics is also performed centrally.

6. A method for managing a plurality of wireless communications within a cellular network, comprising the steps of:

monitoring the transmission characteristics of ones of the wireless communications;

informing ones of the cells of the transmission characteristics of wireless communications monitored in nearby cells; and optimizing the transmission characteristics of wireless communications according to information received regarding the transmission characteristics of wireless communications in nearby cells wherein said optimizing step further comprises the steps of:

modifying ones of the transmission characteristics so as to allow ones of the wireless communications to continue at artificially sub-optimum transmission conditions; and temporarily blocking ones of the wireless communications if the artificially sub-optimum transmission conditions are not feasible for wireless communications.

7. A method for managing a plurality of wireless communications within a cellular network, comprising the steps of:

monitoring the transmission characteristics of ones of the wireless communications;

discriminating between monitored wireless communication transmission characteristics according to a predetermined standard as to whether said monitored transmission characteristics need optimizing in real time or not;

for wireless communication transmission characteristics meeting said standard, optimizing said transmission characteristics in real time; and for wireless communication transmission characteristics not meeting said standard, optimizing said transmission characteristics on a schedule slower than real time.

8. A method for managing a plurality of wireless communications within a cellular network, comprising the steps of:

monitoring the transmission characteristics of ones of the wireless communications;

predicting future wireless communication transmission characteristics based on said monitored wireless communication transmission characteristics;

discriminating between said predicted future wireless communication transmission characteristics according to a predetermined standard as to whether said monitored transmission characteristics need optimizing in real time or not;

for predicted future wireless communication transmission characteristics meeting said standard, optimizing said monitored transmission characteristics in real time; and for predicted future wireless communication transmission characteristics not meeting said standard, optimizing said monitored transmission characteristics on a schedule slower than real time.

9. The method of claim 8, wherein the step of predicting wireless communication transmission characteristics is also performed with reference to pre-recorded network data.

10. The method of claim 9, wherein the prerecorded network data include wireless communication activity statistics.

11. The method of claim 9, wherein the prerecorded network data include territorial topography.

12. The method of claim 9, wherein the prerecorded network data include prevailing signal interference level cartography.

13. A system for managing a plurality of wireless communications within a cellular network, comprising:

means for monitoring the transmission characteristics of ones of the wireless communications; and means for optimizing the transmission characteristics of wireless communications according to monitored transmission characteristics of nearby wireless communications;

wherein said optimizing means further comprises:

means for modifying ones of the transmission characteristics so as to allow ones of the wireless communications to continue at artificially sub-optimum transmission conditions; and means for temporarily blocking ones of the wireless communications if the artificially sub-optimum transmission conditions are not feasible for wireless communications.

14. The system of claim 13, wherein the means for monitoring wireless communication transmission characteristics monitors one or more transmission characteristics selected from the group consisting of:

(a) communication signal strength;

(b) communication interference level;

(c) forward link signal power;

(d) reverse link signal power;

(e) cell assignment;

(f) antenna beam assignment;

(g) communication channel assignment;

(h) handoff status;

(i) territorial location of wireless communications within the cells;

(j) directional travel of mobile wireless communications within the cells; and (k) velocity of mobile wireless communications within the cells.

15. The system of claim 13, wherein the means for optimizing wireless communication transmission characteristics modifies one or more transmission characteristics selected from the group consisting of:

(a) communication signal strength;
(b) forward link signal power;
(c) reverse link signal power;
(d) cell assignment;
(e) antenna beam assignment;
(f) communication channel assignment; and
(g) handoff status.

16. The system of claim 13, wherein the means for monitoring wireless communication transmission characteristics performs said monitoring centrally.

17. The system of claim 16, wherein the means for optimizing wireless communication transmission characteristics also performs said optimizing centrally.

18. A system for managing a plurality of wireless communications within a cellular network, comprising:
   means for monitoring the transmission characteristics of ones of the wireless communications;
   means for informing ones of the cells of the transmission characteristics of wireless communications monitored in nearby cells; and
   means for optimizing the transmission characteristics of wireless communications according to information received regarding the transmission characteristics of wireless communications in nearby cells
   wherein said means for optimizing further comprises:
      means for modifying ones of the transmission characteristics so as to allow ones of the wireless communications to continue at artificially sub-optimum transmission conditions; and
      means for temporarily blocking ones of the wireless communications if the artificially sub-optimum transmission conditions are not feasible for wireless communications.

19. A system for managing a plurality of wireless communications within a cellular network, comprising:
   means for monitoring the transmission characteristics of ones of the wireless communications;
   means for discriminating between monitored wireless communication transmission characteristics according to a predetermined standard as to whether said monitored transmission characteristics need optimizing in real time or not;
   means for optimizing wireless communication transmission characteristics meeting said standard in real time; and
   means for optimizing wireless communication transmission characteristics not meeting said standard on a schedule slower than real time.

20. A system for managing a plurality of wireless communications within a cellular network, comprising:
   means for monitoring the transmission characteristics of ones of the wireless communications;
   means for predicting future wireless communication transmission characteristics based on said monitored wireless communication transmission characteristics;
   means for discriminating between said predicted future wireless communication transmission characteristics according to a predetermined standard as to whether said monitored transmission characteristics need optimizing in real time or not;
   for predicted future wireless communication transmission characteristics meeting said standard, means for optimizing said monitored transmission characteristics in real time; and
   for predicted future wireless communication transmission characteristics not meeting said standard, means for optimizing said monitored transmission characteristics on a schedule slower than real time.

21. The system of claim 20, wherein the means for predicting wireless communication transmission characteristics performs said prediction with reference to pre-recorded network data.

22. The system of claim 21, wherein the prerecorded network data include wireless communication activity statistics.

23. The system of claim 22, wherein the pre-recorded network data include territorial topography.

24. The system of claim 21, wherein the prerecorded network data include prevailing signal interference cartography.

25. A method for compiling prevailing signal interference data for use in managing wireless communications in a cellular network, comprising the steps of:
   dividing ones of the cells into zones;
   monitoring ones of the zones for signal interference levels prevailing therein;
   mapping a plurality of said monitored zones with their associated monitored prevailing signal interference levels to create an interference map;
   anticipating the likely future path of a tracked mobile station moving within said monitored zones;
   predicting future signal transmission conditions likely to prevail between a base station and said tracked mobile station as said tracked mobile station moves along an anticipated future path;
   predicting future adjustments to wireless communications characteristics likely to optimize wireless communications as said tracked mobile station encounters said predicted future signal transmission conditions;
      wherein said predicting steps predict said future signal conditions and said future adjustments using said interference map;
   scheduling said predicted future adjustments according to anticipated travels of said tracked mobile station; and
   executing said predicted adjustments according to said schedule.

26. The method of claim 25, wherein each zone is monitored by a separate narrow beam antenna.

27. The method of claim 25 wherein said monitoring step is performed continuously, regardless of any lack of wireless communication activity.

28. The method of claim 25, in which the step of monitoring is performed centrally.

29. The method of claim 25, in which the step of mapping is performed centrally.

30. The method of claim 25, in which the step of mapping further comprises:
   remotely mapping ones of the zones with their associated monitored prevailing signal interference levels to compile a plurality of substantially contiguous maps; and
   centrally combining ones of said substantially contiguous maps to compile a regional map.

31. A method of managing wireless communications between a base station and at least one active mobile station within a cellular network, comprising the steps of:
   monitoring transmission characteristics of the wireless communications;
   tracking the territorial movement of ones of the active mobile stations;

anticipating the likely future travels of said tracked mobile stations;

predicting future signal transmission conditions likely to prevail between the base station and the active mobile stations as said tracked mobile stations move along their anticipated travels;

predicting future adjustments to ones of the wireless communications transmission characteristics likely to optimize wireless communications as said tracked mobile stations encounter said predicted future signal transmission conditions;

scheduling said adjustments according to the anticipated travels of said tracked mobiles; and executing said adjustments according to said schedule.

32. The method of claim 31, wherein the step of anticipating the likely future travels of mobile stations includes reference to one or more data sets selected from the group consisting of:

(a) pre-established topographical data;
(b) current active mobile station movement data;
(c) historical mobile station movement data;
(d) current wireless communication density data;
(e) historical wireless communication density data; and
(f) historical peak-usage mobile station activity data.

33. The method of claim 31, wherein the step of predicting likely future signal transmission conditions includes reference to one or more data sets selected from the group consisting of:

(a) pre-established topographical data;
(b) current regional signal interference cartographical data;
(c) historical regional signal interference cartographical data; and
(d) anticipated path data for one or more current active calls.

34. The method of claim 31, wherein the step of predicting future adjustments includes reference to historical data on adjustments to wireless communications transmission characteristics.

35. The method of claim 31, wherein the step of executing said adjustments includes modifying ones of the transmission characteristics so as to allow ones of the wireless communications to continue at artificially sub-optimum transmission conditions for the sake of improving transmission conditions for other wireless communications.

* * * * *